United States Patent
Sasaki (10) Patent No.: US 9,780,473 B2
(45) Date of Patent: Oct. 3, 2017

(54) MATING CONNECTOR USING SLIDER TO DEFORM CONTACTS

(71) Applicant: Tyco Electronics Japan G.K., Kanagawa-ken (JP)

(72) Inventor: Yoichi Sasaki, Kanagawa-ken (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 14/075,221

(22) Filed: Nov. 8, 2013

(65) Prior Publication Data
US 2014/0127922 A1    May 8, 2014

(30) Foreign Application Priority Data
Nov. 8, 2012  (JP) ................. 2012-246246

(51) Int. Cl.
| | |
|---|---|
| *H01R 13/187* | (2006.01) |
| *H01R 12/89* | (2011.01) |
| *G06K 13/08* | (2006.01) |
| *G06K 7/00* | (2006.01) |
| *H01R 13/635* | (2006.01) |
| *H01R 13/24* | (2006.01) |

(52) U.S. Cl.
CPC .......... *H01R 13/187* (2013.01); *H01R 12/89* (2013.01); *G06K 7/0021* (2013.01); *G06K 13/08* (2013.01); *G06K 13/085* (2013.01); *G06K 13/0806* (2013.01); *G06K 13/0831* (2013.01); *H01R 13/2442* (2013.01); *H01R 13/635* (2013.01)

(58) Field of Classification Search
CPC .. H01R 13/193; H01R 13/635; G06K 7/0021; G06K 13/08; G06K 13/0831; G06K 13/085; G06K 13/0806

USPC .................................. 439/259, 630
See application file for complete search history.

(56) References Cited

U.S. PATENT DOCUMENTS

| | | | |
|---|---|---|---|
| 4,936,790 A * | 6/1990 | De La Cruz ........... | H01R 12/87 235/482 |
| 5,750,973 A | 5/1998 | Kaufman et al. | |
| 6,036,519 A | 3/2000 | Lopata et al. | |
| 6,345,999 B1 | 2/2002 | Okuyama et al. | |
| 6,679,714 B2 | 1/2004 | Kimura | |
| 6,796,842 B1 * | 9/2004 | Wang ................... | G06K 7/0021 439/630 |

(Continued)

FOREIGN PATENT DOCUMENTS

| | | |
|---|---|---|
| DE | 4010398 A1 | 10/1991 |
| DE | 4336192 A1 | 5/1995 |

(Continued)

OTHER PUBLICATIONS

European Search Report, Application No. 13191896.3, dated Jan. 16, 2014, 7 pages.

(Continued)

*Primary Examiner* — Abdullah Riyami
*Assistant Examiner* — Justin Kratt
(74) *Attorney, Agent, or Firm* — Barley Snyder (57) ABSTRACT

A connector is provided that includes a housing, a contact, and a slider. The housing includes a mating connector receiving section, while the contact extends into the mating connector receiving section. The slider is positioned on the housing and includes a cam plate and a protruding wall positioned along a rear end of the cam plate.

18 Claims, 9 Drawing Sheets

(56) References Cited

U.S. PATENT DOCUMENTS

| 7,044,797 B1* | 5/2006 | Lai .............................. 439/630 |
| 2002/0070274 A1 | 6/2002 | Lee |
| 2011/0021079 A1* | 1/2011 | Tung ..................... G06K 13/08 |
| | | 439/630 |

FOREIGN PATENT DOCUMENTS

| JP | 160377 U | | 4/1989 |
| JP | 09251878 A | * | 9/1997 |
| JP | 2009152144 A | | 9/2009 |

OTHER PUBLICATIONS

European Patent Office Communication, Appl. No. 13 191 896.3, dated Mar. 2, 2016, 6 pages.
Japanese Office Action, dated Jun. 23, 2016, 4 pages.
Abstract of JPH09251878, dated Sep. 22, 1997, 2 pages.

* cited by examiner

MATING CONNECTOR USING SLIDER TO DEFORM CONTACTS

CROSS-REFERENCE TO RELATED APPLICATIONS

This application claims the benefit of the filing date under 35 U.S.C. §119(a)-(d) of Japanese Patent Application No. 2012-246246, filed Nov. 8, 2012.

FIELD OF INVENTION

The present invention relates to a connector and, in particular, to a connector having a contact that connects with a connection pad of a mating connector.

BACKGROUND

Connectors have been developed that include a plurality of contacts to transmit electrical signals. These connectors tend to increase in size as the number of contacts increases. In addition, these connectors tends to require a large mating force when the connector is mated with a mating connector.

There is known a connector that requires a lower threshold of force for connection. This known connector involves the rotation of a lever after mating with a mating connector with the connector is performed (see, for example, Japanese Patent Publication JP 2002-170642A).

The known connector can be mated with a mating connector by a small force since mating completion is performed by, for example, a lever operation and the like, and thus, the known connector is suitable for one having many contacts. However, the known connector requires not only an operation of mating a mating connector, but also, subsequently, an operation of, for example, a lever operation and the like, and thus, requires operations two times for mating once. In addition, the connection requires additional members such as a lever member, a member for operating the lever member and the like, and further, an indicator for remembering a second operation (for example, a lever operation) and other schemes are also required, and thus, such connector tends to have a complicated configuration.

SUMMARY

In view of the foregoing problems, inter alia, a connector is provided whose mating is completed by only one insertion operation of a mating connector, and which has a configuration suitable for including many contacts.

The connector includes a housing, a contact, and a slider. The housing includes an mating connector receiving section, while the contact extends into the mating connector receiving section. The slider is positioned on the housing and includes a cam plate and a protruding wall positioned along a rear end of the cam plate.

BRIEF DESCRIPTION OF THE DRAWINGS

The above and other features of the present invention will become more apparent by describing in detail exemplary embodiments thereof with reference to the accompanying drawings, in which:

FIG. 9 is a sectional view of the connector according to the invention when a mating connector is inserted there in.

DETAILED DESCRIPTION OF THE EMBODIMENT(S)

In the following, an embodiment of the connector according to the invention will be described with reference to the attached drawings.

Now with reference to FIGS. 1 to 8, a connector 100 according to the invention will be described.

In an exemplary embodiment of the invention, the connector 100 includes a plurality of contacts 10, a base housing 20, a slider 30, an upper housing 40 and an outer shell 50 made of metal.

A mating connector receiving passageway which is covered with a lid member 64 and into which a tabular insertion section of a mating connector is to be inserted is provided along a front wall 25 of a base housing 20 which is exposed toward the front.

The base housing 20 includes a bottom plate 21 with a plurality of base elongated openings 211 that penetrate from a top surface through a bottom surface thereof. The contacts 10 are press fit into the base elongated opening 211 from a side of a bottom surface 219 of the bottom plate 21 (see FIGS. 6, 7 and 8).

Portions of the contacts 10 that extend from the bottom plate 21 to the side of the bottom surface 219 are to be connected to a circuit board (not illustrated) on which the connector 100 is to be placed.

Figure 7:
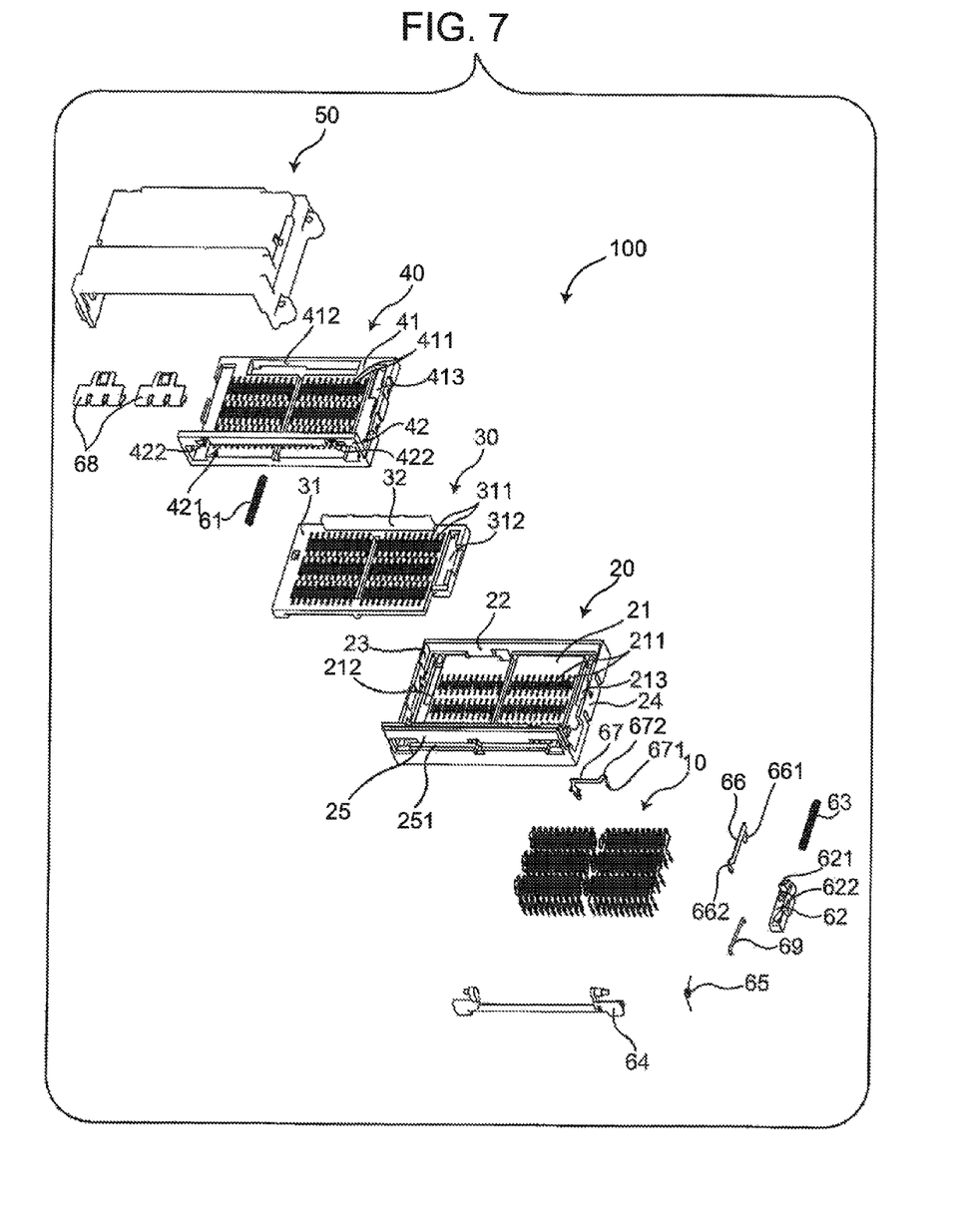
FIG. 7 is a top exploded perspective view of the connector of FIG. 1.
Figure 8:
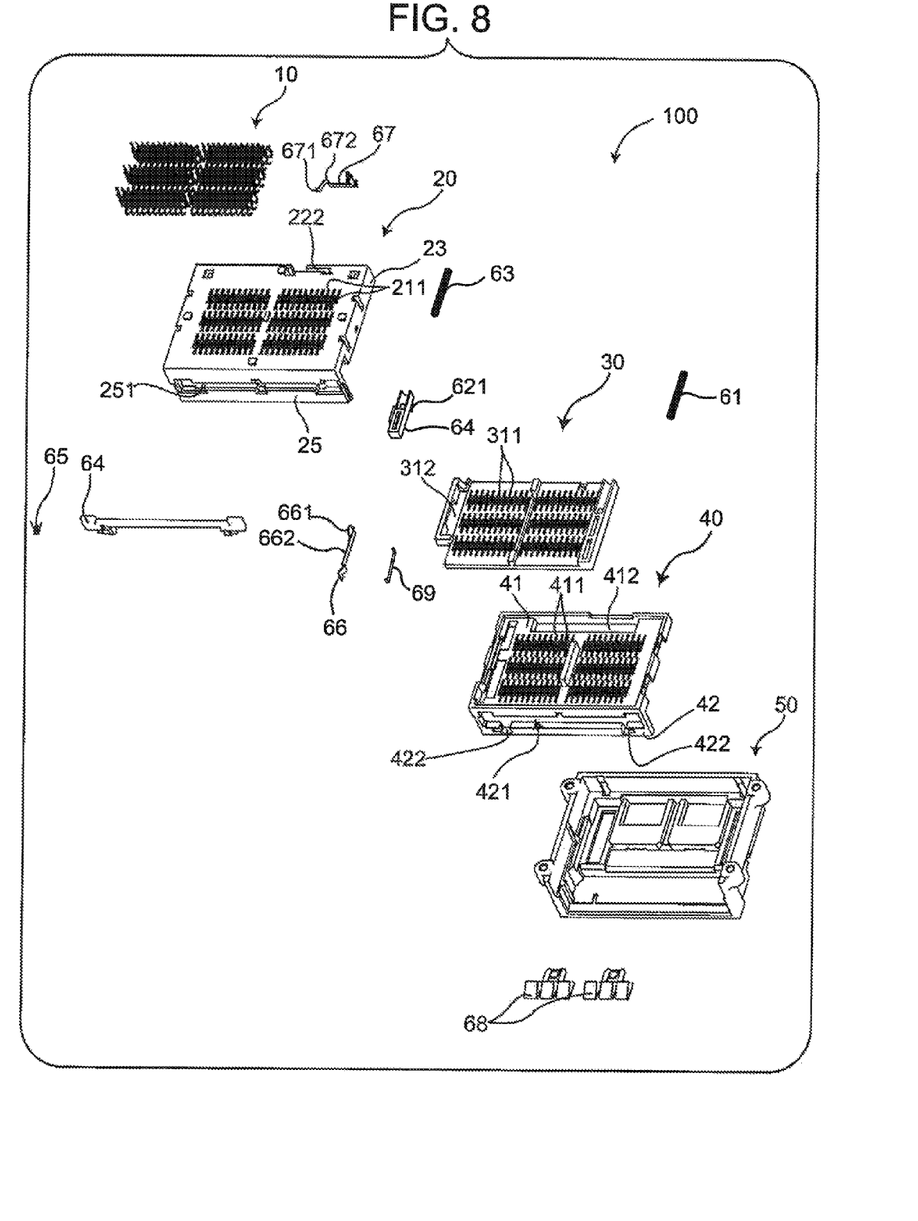
FIG. 8 is a bottom exploded perspective view of the connector of FIG. 1.

Further, as shown in FIG. 7, a plurality of base grooves 212, 213 are formed along the bottom plate 21 in addition to the base elongated openings 211. In the shown embodiment, a coil spring 61 is positioned in one base groove 212 disposed on the left, and a cam member 62 in which a so-called heart cam groove is formed and a coil spring 63 are received in the base groove 213 on the right. One end of a cam bar 69 is inserted into the heart cam groove formed in the cam member 62. The other end of the cam bar 69 is supported by the base housing 20.

In addition, the base housing 20 includes a rear wall 22, left and right walls 23, 24 and a front wall 25 upstanding so as to surround the bottom plate 21.

A mating connector receiving passageway is provided along the front wall 25 into which an insertion section of a mating connector is inserted. The lid member 64 which is supported by the upper housing 40 is arranged inside the mating connector receiving passageway, thereby forming a configuration in which the mating connector receiving passageway is closed by the lid member 64 (see FIG. 1). The lid member 64 has a configuration in which the lid member 64 is pressed by a tip of the insertion section of the mating connector, and when the mating connector is removed, the lid member 64 closes the mating connector receiving passageway by an action of a torsion spring 65.

Figure 4:
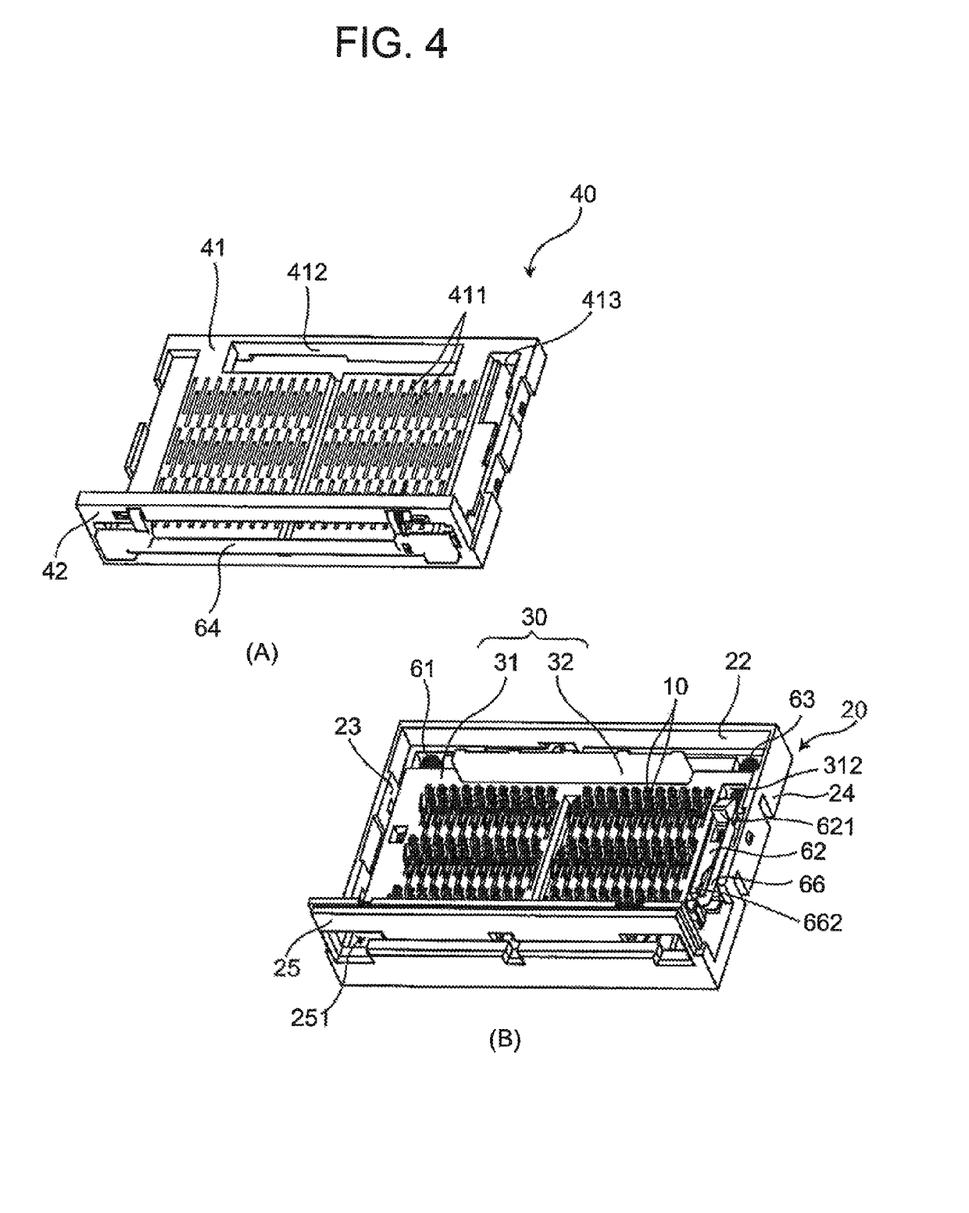
FIG. 4 is an exploded perspective view of the connector after removing the outer shell.

The slider 30 is arranged on the bottom plate 21 of the base housing 20 as shown in part (B) of FIG. 4. The slider 30 includes a cam plate 31 and a protruding wall 32 positioned along a rear end of the cam plate 31. As shown, a plurality of contact deforming sections 311 penetrate from the top surface to the bottom surface and through which the contacts 10 are allowed to pass. Additionally, an elongated cam receiving section 312 through which the cam member 62 is allowed to pass is formed along the cam plate 31. The cam plate 31 may be pressed toward the front wall 25 by the two coil springs 61, 63 in the base housing 20. The coil spring 61 is received in the base groove 212 to directly press the slider 30 toward the front wall 25. The other coil spring 63 is arranged in the base groove 213 of the base housing 20 to directly press the cam member 62. The cam member 62 is also placed in the elongated cam receiving section 312 of the slider 30. For this reason, the cam member 62 pressed by the coil spring 63 presses a wall of the elongated cam receiving section 312 in the slider 30, so that the slider 30 is pressed using the cam member 62 toward the front wall 25 in the base housing 20.

As shown in FIG. 4, the upper housing 40 is arranged on the slider 30. And shown in FIG. 2, the outer shell 50 covers the upper housing 40. The outer shell 50 is made of metal and is held at a ground potential, thereby serving for shielding the connector 100.

The upper housing 40 includes an upper plate 41 and a front wall 42 extending from the upper plate 41 on a front side thereof. The upper plate 41 forms a space between the upper plate 41 and the bottom plate 21 of the base housing 20 in which space the slider 30 is disposed. A plurality of elongated contact passageways 411 which allow the contacts 10 to pass there through are formed in the upper plate 41. In addition, an elongated wall opening 412 which allows the protruding wall 32 of the slider 30 to pass there through is also formed in the upper plate 41.

In addition, a protrusion 621 is provided on the cam member 62, and an elongated protrusion opening 413 is formed in the upper plate 41 of the upper housing 40 to allow the protrusion 621 of the cam member 62 to pass there through.

Figure 5:
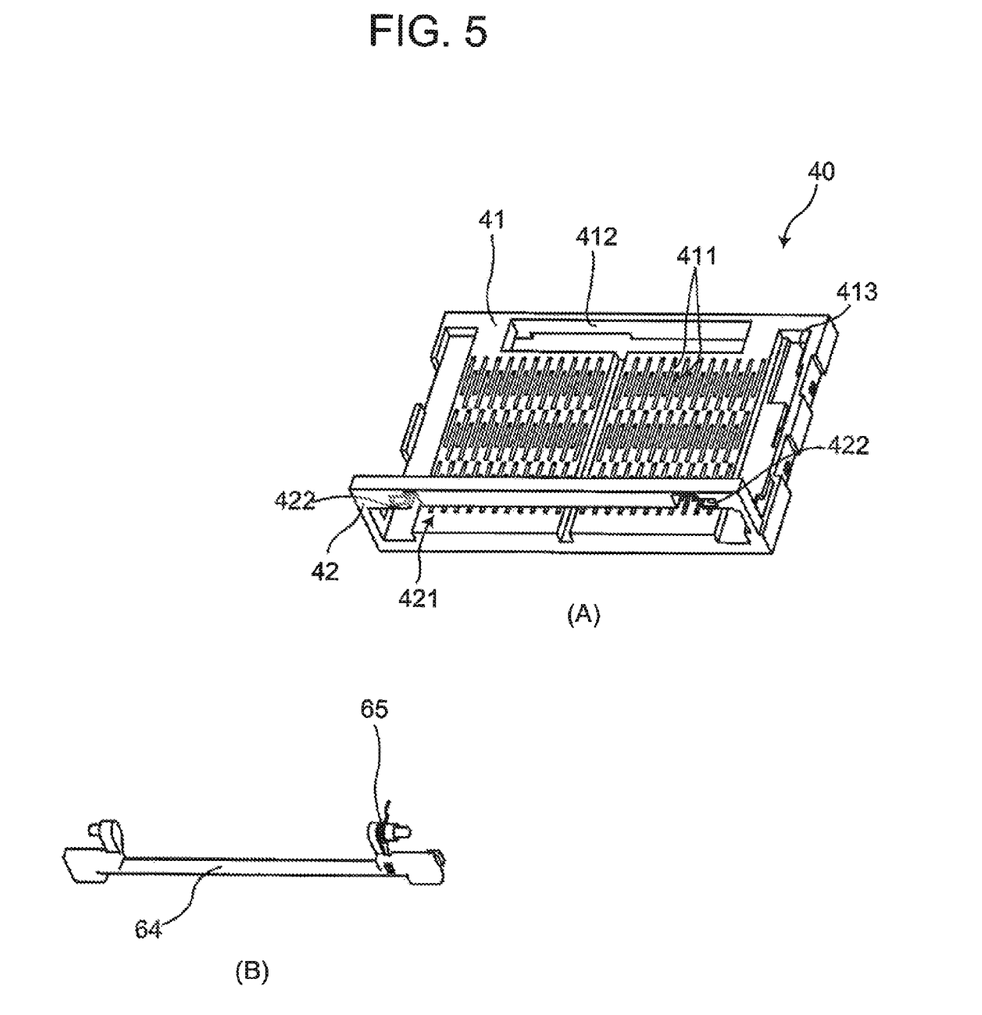
FIG. 5 is an exploded perspective view of a lid separated from the upper housing.
Figure 6:
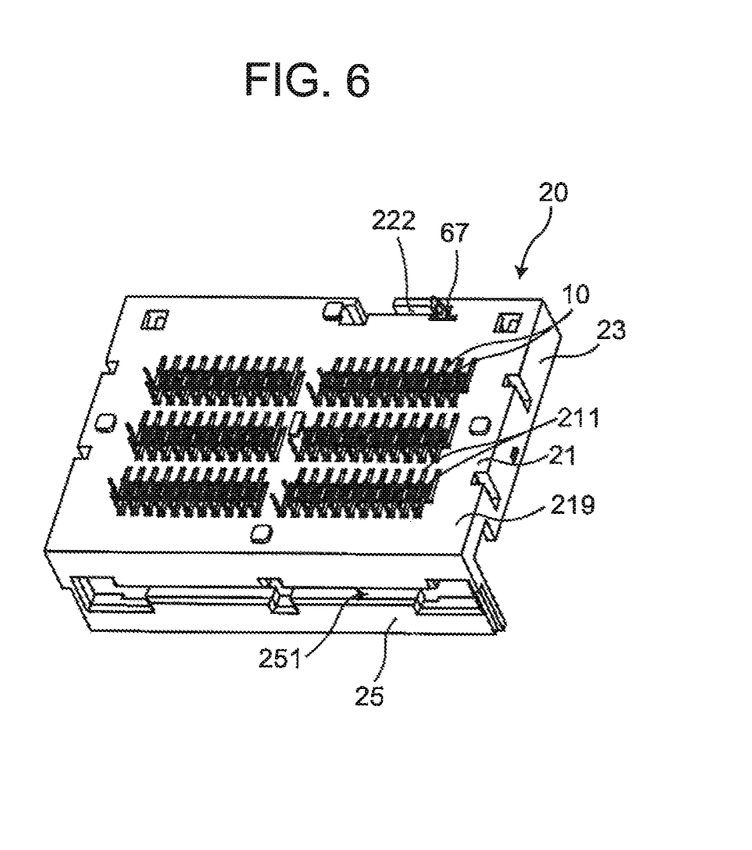
FIG. 6 is a perspective view of the base housing.

In addition, a receiving passageway 421 formed in the front wall 42 of the upper housing 40 to receive the mating housing which is inserted through the insertion passageway 251 formed in the front wall 25 of the base housing 20. In addition, as shown in FIG. 5, a lid support 422, which rotatably supports the lid member 64, is provided in an upper portion of the receiving passageway 421 of the front wall 42. The lid member 64 is supported by the lid support 422, as shown in FIG. 4, to be rotatable inwardly upward. The lid member 64 is biased by a torsion spring 65.

Figure 1:
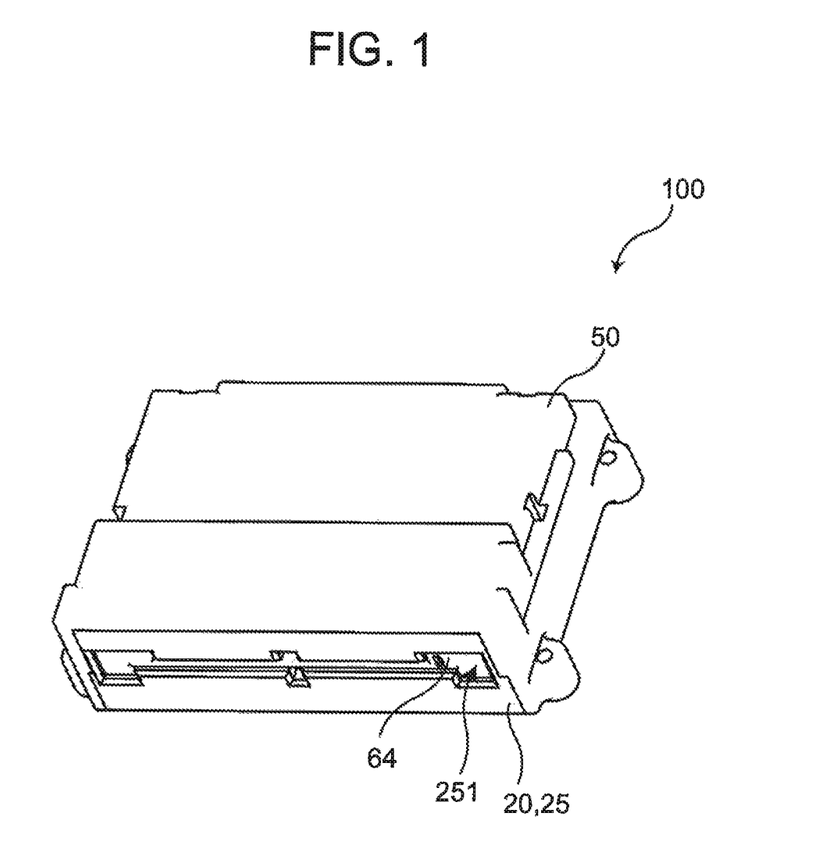
FIG. 1 is a perspective view of a connector according to the invention.
Figure 2:
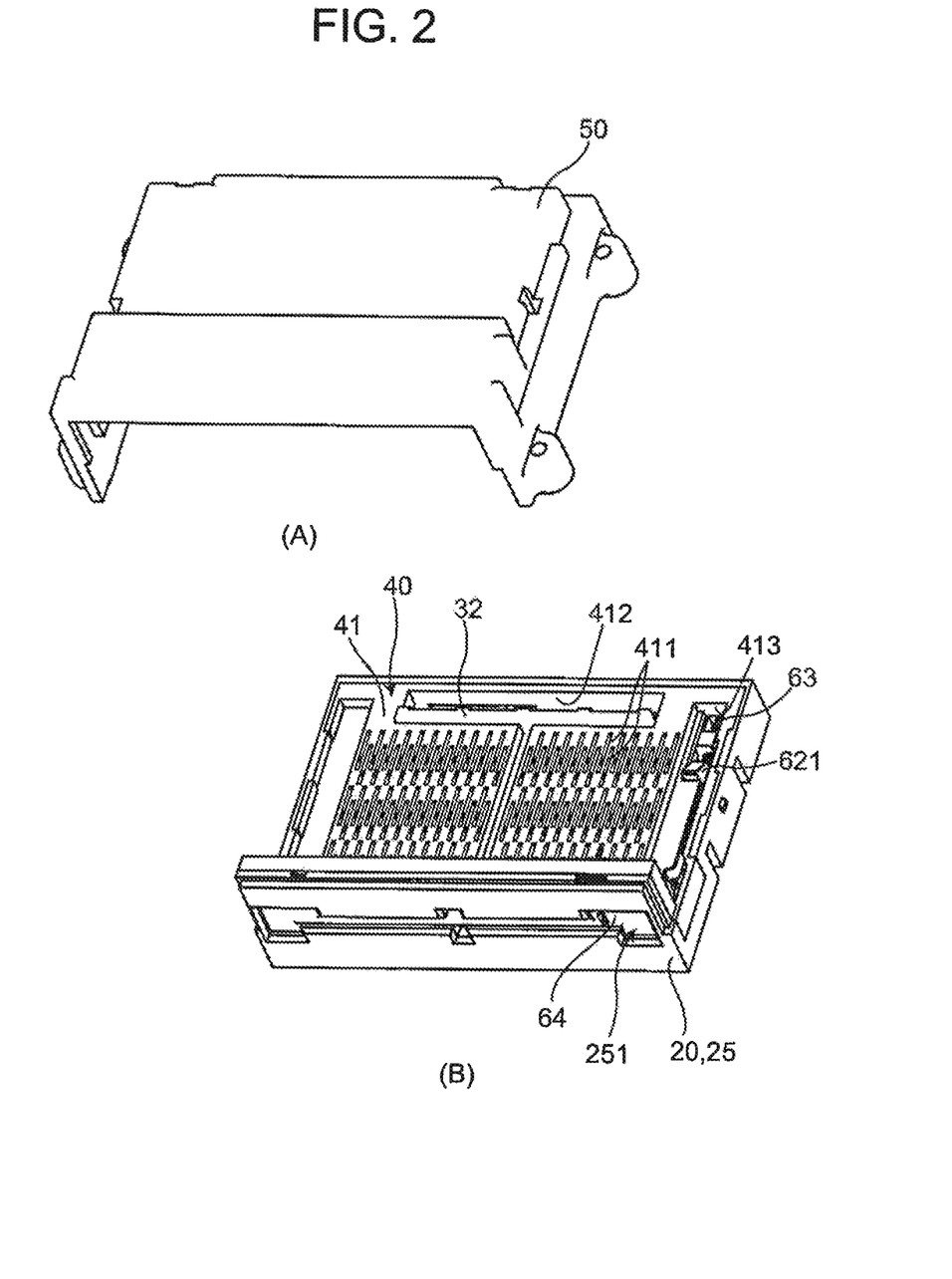
FIG. 2 is an exploded perspective view of the connector of FIG. 1, showing an outer shell being removed from an upper housing and a base housing.

The mating connector is inserted through the insertion passageway 251 in FIG. 1 of the base housing 20. Next, the mating connector pushes up the lid member 64 and is inserted onto the upper housing 40 of the assembly, as shown in FIG. 2, from the receiving passageway 421 of the upper housing 40. A tip of the mating connector bumps against the protrusion 621 of the cam member 62 to slide the cam member 62 toward the rear wall 22 against the biasing of the coil spring 63. When the cam member 62 is slid toward the rear wall 22 and the protrusion 621 is positioned by the protruding wall 32 of the slider 30, the tip of the mating connector bumps against the protrusion 621 of the cam member 62 and also against the protruding wall 32 of the slider 30. For this reason, the mating connector slides the cam member 62 and the slider 30 together toward the rear wall 22 against the biasing of the two coil springs 61, 63. In other words, in the connector 100 according to the invention, the space over the upper plate 41 of the upper housing 40, i.e., an insertion receiving section corresponds to a space between the upper plate 41 and the outer shell 50 which is put over the upper plate 41 to cover the upper plate 41. The insertion receiving section receives the mating connector.

Here, top ends of the contacts 10 have such shapes that, before the insertion section of the mating connector is inserted, the top ends of the contacts 10 are positioned inside the elongated contact passageways 411 which are provided in the upper plate 41 of the upper housing 40 and allows the contacts 10 to pass there through, and do not protrude from the upper surface of the upper plate 41 (see FIG. 2). In other words, before the insertion of the mating connector, the contacts 10 are face the mating connector but are positioned away when the mating connector is first inserted.

In addition, a plurality of connection pads whose arrangement matches that of the contacts 10 are formed on a surface of the mating connector whose surface faces the upper plate 41 of the upper housing 40.

The mating connector is inserted into the insertion receiving section, i.e., onto the upper surface of the upper plate 41 of the upper housing 40, and at the time of the final movement of the insertion, the protruding wall 32 of the slider 30 is pressed by the mating connector to be slid. Subsequently, walls of the contact deforming section 311 press the contacts 10 so as to deform the contacts 10 in a direction of protruding from the elongated contact passageways 411 of the upper plate 41 in the upper housing 40. The mating connector is inserted on the upper surface of the upper plate 41, and thus, the contacts 10 are electrically connected to the connection pads formed on the bottom surface of the mating connector. A manner as to how the contacts 10 are deformed by being pressed by the slider 30 will be described later.

When the mating connector is inserted up toward the rear wall 22, and the connection pads and the contacts 10 are connected with each other, the heart cam groove of the cam member 62 and the cam bar 69 are engaged with each other, so that the cam member 62 is locked while being slid toward the rear wall 22. Since the cam member 62 enters the elongated cam receiving section 312 of the cam plate 31, to slide the slider 30 together toward the rear wall 22, the cam member 62 is locked and thus the slider 30. An insertion piece 661 of a lock 66 is inserted into an insertion passageway 622, and a lock section 662 of the lock 66 is engaged with a depression section (not shown) on a side surface of the mating connector to lock the mating connector when inserted.

In addition, a switch 67 is supported in a rear groove 222 positioned on a side of the rear end of the base housing 20. A rear end 671 of the switch 67 is pressed by the slider 30 which is being slid toward the rear wall 22, and a contact section 672 makes contact with the outer shell 50 to be the ground potential, which is detected by a circuit board, so that the mating between the connector 100 and the mating connector is recognized.

Figure 3:
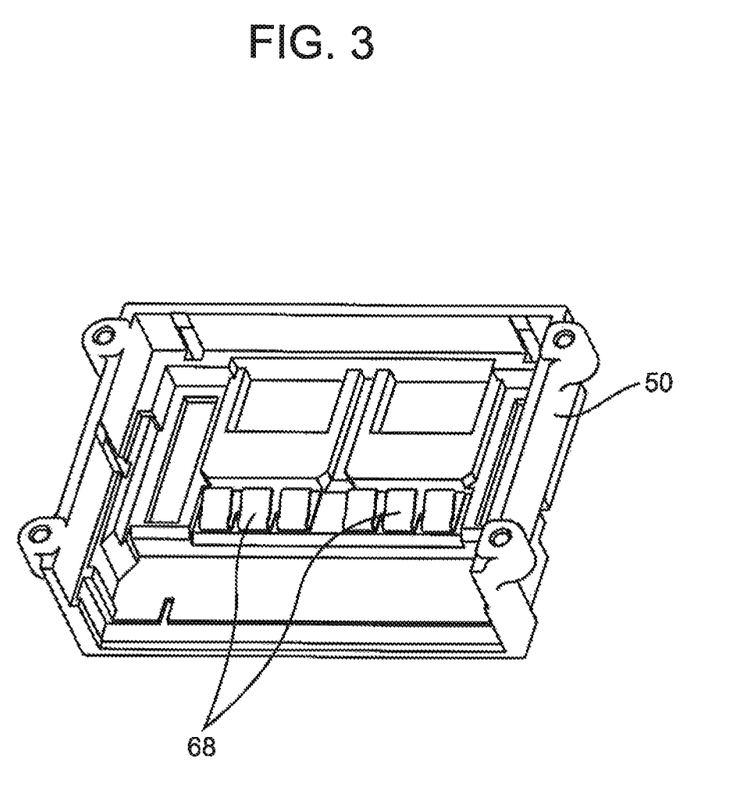
FIG. 3 is a bottom perspective view of the outer shell.

As shown in FIG. 3, the spring contacts 68 made of metal are attached to an inner surface of the outer shell 50. A ground pad on the mating connector faces the outer shell 50. The spring contacts 68 are connected to the ground pad and serves for keeping the ground pad in the ground potential.

When the mating connector is pressed toward the rear wall 22, engagement between the heart cam groove of the cam member 62 and a cam bar 69 is released. For this reason, the slider 30 is slid forward by the biasing of the two coil springs 61, 63. In addition, the cam member 62 is also slid forward, so that the mating connector is released. In such way, the mating connector is pressed out from the connector 100.

Figure 9:
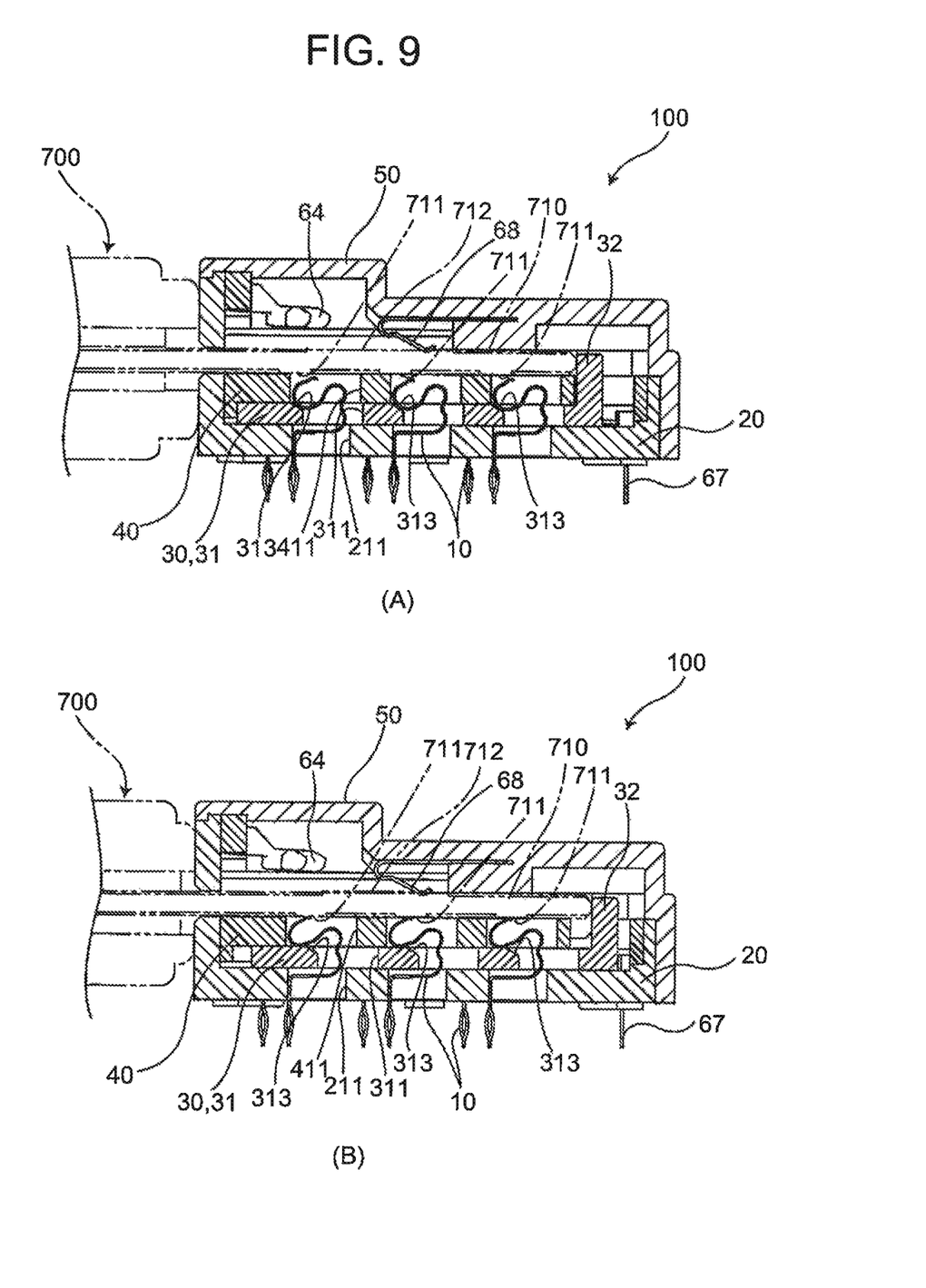

Now with reference with FIG. 9, operations of the a mating connector 700 having an insertion section 710 to connect with the connector 100 according to the invention will be described.

As shown, the insertion section 710 of the mating connector 700 is inserted up to a position toward the rear wall 22. The insertion section 710 of the mating connector 700 is tabular, and connection pads 711 corresponding to the contacts 10 are formed on a surface of the insertion section 710 that faces the contacts 10. In addition, a ground connection pad 712 is formed on a second surface of the insertion section 710 that faces the outer shell 50.

As described above, in the connector 100 according to the invention, the base housing 20, the slider 30 and the upper housing 40 are stacked from a bottom to a top in this order on the circuit board (not illustrated) and are connected to the circuit board. The upper housing 40 is covered by the outer shell 50 so that the insertion receiving section for receiving the insertion section 710 of the mating connector 700 therein is formed.

The contacts 10 are press fit into the base elongated passageways 211 of the base housing 20 to be held. The contacts 10 go through the contact deforming section 311 of the slider 30, and further enter the elongated contact passageways 411 of the upper housing 40. However, as shown in FIG. 9, before the insertion and at the beginning of the insertion of the insertion section 710 of the mating connector 700, the top ends of the contacts 10 remain inside the elongated contact passageways 411 of the upper housing 40. In other words, before the insertion and at the beginning of the insertion, the contacts 10 are located at positions which face the insertion section 710 and also are separated from the insertion section 710 when the insertion section 710 of the mating connector 700 is inserted into the insertion receiving section. Cam surfaces 313 oriented obliquely upward are formed on the walls which are included in the respective contact deforming section 311 of the cam plate 31 of the slider 30 and are on the rear side (the left side in FIG. 9). When the slider 30 is pressed by a tip of the insertion section 710 of the mating connector 700 and slid toward the rear wall 22, the cam surfaces 313 bump midpoints of the contacts 10, respectively. As a result, in the course in which the insertion section 710 of the mating connector 700 is further being inserted, portions positioned higher than the midpoints in the contacts 10 are deformed by the cam surfaces 313 such that the portions positioned more upward than the midpoints in the contacts 10 are lifted by the cam surfaces 313, respectively. At this moment, the contacts 10 are pressed against the corresponding connection pads 711 which are formed on the first surface of the insertion section 710 of the mating connector 700, so that the contacts 10 are electrically conducted to the corresponding connection pads 711, respectively. In addition, the spring contacts 68 attached to the outer shell 50 make contact with the grounding connection pad 712 formed on the second surface of the insertion section 710.

As described above, the contacts 10 are pressed against the connection pads 711 when the insertion section 710 of the mating connector 700 is inserted into the insertion receiving section. For this reason, the insertion section 710 is inserted by a low insertion force without suffering interference from the contacts 10. In addition, slider 30 receives a force from the insertion section 710 of the mating connector 700 to press the contacts 10 against the connection pads 711, so that the mating is completed only by the insertion operation.

Further, the connection pads are arranged on the insertion section 710 of the mating connector 700, and corresponding to the contacts 10. However, when the contacts 10 come into contact with the insertion section 710 including the connection pads 711 the mating connector 700 is connected. For this reason, there is no risk in which a contact 10 which does not correspond to a corresponding connection pad 711 makes contact with the corresponding connection pad 711 during insertion to cause malfunction to occur. In addition, there is no possibility in which a connection pad 711 positioned more forward in the insertion direction is rubbed with a contact 10 more frequently to decrease the life thereof.

However, in a case in which, even if a contact which does not correspond to a corresponding connection pad 711 makes contact, malfunction does not occur, a configuration in which the contacts 10 slightly protrude from the upper plate 41 of the upper housing 40 and the insertion section 710 is inserted while the insertion section 710 of the mating connector 700 slightly makes contact with the contacts 10.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:
1. A connector comprising:
  a housing having a front wall, an opposite rear wall, and a mating connector receiving section;
  a slider positioned within the housing and having a cam plate and a protruding wall positioned along a rear end of the cam plate, the slider movable between a first position closer to the front wall and a fully displaced second position closer to the rear wall; and
  a plurality of identical contacts secured to the housing and arranged in at least three rows extending perpendicular to a mating connector insertion direction, each contact having a contacting portion positioned between the slider and the mating connector receiving section, each contact extending into the mating connector receiving section when the cam plate is in contact with the contacting portion; wherein
  the cam plate has a contact deforming section disposed along the slider that deforms the contacting portion of each contact only in the second position.
2. The connector according to claim 1, wherein the housing includes a base housing and an upper housing.
3. The connector according to claim 2, wherein the slider is positioned on a bottom plate of the base housing.
4. The connector according to claim 3, wherein the base housing includes a mating connector receiving passageway covered with a lid member.
5. The connector according to claim 1, wherein the housing includes a base housing having a bottom plate with a plurality of base elongated openings that extend from a top surface through to a bottom surface thereof.
6. The connector according to claim 5, wherein each contact extends into one base elongated opening from the bottom surface of the bottom plate.
7. The connector according to claim 5, wherein the slider is arranged on the bottom plate.

8. The connector according to claim 5, wherein the base housing includes a plurality of base grooves disposed along the bottom plate.

9. The connector according to claim 8, further comprising a coil spring positioned in one of the plurality of base grooves.

10. The connector according to claim 9, further comprising a cam member positioned in another one of the plurality of base grooves.

11. The connector according to claim 10, further comprising a cam bar supported in the cam member and the base housing.

12. The connector according to claim 11, wherein the cam plate includes a cam receiving section through which the cam member passes.

13. The connector according to claim 1, wherein the housing includes an upper housing arranged on the slider.

14. The connector according to claim 13, wherein the upper housing includes an upper plate and a front wall extending from the upper plate along a front side thereof.

15. The connector according to claim 14, further comprising a receiving passageway formed in the front wall.

16. A connector assembly, comprising:
   a mating connector having an insertion section and a plurality of connection pads disposed on a first surface of the insertion section;
   a connector having:
      a housing having a front wall, an opposite rear wall, and a mating connector receiving section;
      a plurality of identical contacts secured to the housing and arranged in at least three rows extending perpendicular to a mating connector insertion direction, each contact facing the first surface and corresponding to one connection pad; and
      a slider positioned within the housing and moveable by the insertion section between a first position closer to the front wall and a second position closer to the rear wall in which the insertion section is fully inserted into the mating connector receiving section, the slider deforming each contact and pressing each contact against one connection pad only in the second position.

17. The connector assembly according to claim 16, wherein the slider includes a protruding wall that abuts the insertion section when the insertion section is inserted into the mating connector receiving section.

18. The connector assembly according to claim 17, wherein the slider further includes a cam plate that deforms each contact and presses each contact toward the first surface of the insertion section.

* * * * *